United States Patent [19]

Oswald et al.

[11] 4,454,925
[45] Jun. 19, 1984

[54] UNDERCARRIAGE FOR ARMORED PERSONNEL CARRIER

[75] Inventors: Norman D. Oswald, Duncanville; Carl M. Franklin, Midlothian; Marc H. Gutzler, Duncanville; Harry S. Mankey, Dallas, all of Tex.

[73] Assignee: Standard Manufacturing Company, Dallas, Tex.

[21] Appl. No.: 426,218

[22] Filed: Sep. 28, 1982

[51] Int. Cl.³ .............................................. B62D 61/10
[52] U.S. Cl. ........................................ 180/22; 280/104
[58] Field of Search ............. 180/22, 23, 24.04, 24.08, 180/9.54, 9.56, 72; 280/104, 676, 685, 701, 690

[56] References Cited

U.S. PATENT DOCUMENTS

| | | | |
|---|---|---|---|
| 1,836,446 | 12/1931 | Christie | 180/9.2 |
| 1,858,784 | 5/1932 | Masury | 180/72 |
| 1,902,712 | 3/1933 | Leipert | 180/24.11 |
| 1,938,498 | 12/1933 | Porcello | 180/22 |
| 1,938,847 | 12/1933 | Masury | 180/72 |
| 2,024,199 | 12/1935 | Barnes et al. | 180/72 |
| 2,091,509 | 8/1937 | Kramer | 180/72 |
| 2,269,728 | 1/1942 | Mills | 280/104 |
| 2,299,006 | 10/1942 | Brown | 180/72 |
| 2,319,978 | 5/1943 | Collender | 180/72 |
| 3,105,700 | 10/1963 | Hardman | 280/685 |
| 3,165,331 | 1/1965 | Hardman et al. | 280/104 |
| 3,299,978 | 1/1967 | Sponsler | 180/9.52 |
| 3,304,097 | 2/1967 | Lewis | 280/676 |
| 3,372,766 | 3/1968 | Lifferth | 180/22 |
| 3,525,534 | 8/1970 | Madler et al. | 280/104 |
| 3,566,825 | 3/1971 | Ruf | 180/22 |
| 3,656,572 | 8/1972 | Mercier | 180/72 |
| 3,809,004 | 5/1974 | Leonheart | 180/22 |
| 4,056,158 | 11/1977 | Ross | 180/6.48 |
| 4,285,627 | 8/1981 | Oswald et al. | 414/695.5 |

FOREIGN PATENT DOCUMENTS 1308726  10/1962  France ............................ 280/104

Primary Examiner—Joseph F. Peters, Jr.
Assistant Examiner—Ross Weaver
Attorney, Agent, or Firm—Michael A. O'Neil

[57] ABSTRACT

An armored personnel carrier (10) includes a hull (14) supported on two undercarriages (12). Each undercarriage (12) includes a primary frame (22) and a plurality of secondary frames (26) which in turn carry wheel members (28). The secondary frames (26) are urged to pivot away from the primary frame (12) by spring mechanisms (38). The center secondary frames (26c) are each biased outwardly by two spring mechanisms (38) while the endmost secondary frames (26e) are biased outwardly by a single spring mechanism (38). The wheel members (28) are driven by a drive mechanism (64), a primary transmission (58) enclosed within the primary frame (22) and a plurality of secondary transmissions (82) each enclosed within one of the secondary frames (26).

24 Claims, 5 Drawing Figures

UNDERCARRIAGE FOR ARMORED PERSONNEL CARRIER

TECHNICAL FIELD

This invention relates to vehicular undercarriages, and more particularly to an undercarriage especially adapted for use in conjunction with armored personnel carriers.

BACKGROUND ART

Heretofore, armored personnel carriers have generally comprised track vehicles. The advantages that are derived from the use of track vehicles in areas of highly adverse terrain are well known. It is also generally known that track vehicles are limited to slow speeds and cannot operate at moderate speeds, such as 30 or 40 m.p.h., even over smooth surfaces such as highways. Another limitation in the use of track vehicles involves the fact that occupants thereof frequently experience a very uncomfortable ride.

The use of track vehicles came into vogue during World Wars I and II which were fought over vast areas and under such differing adverse terrains as beaches, farmlands, trenches, mountains, etc. Modern warfare often poses quite different problems. For example, terrorist activities or insurrections may require the deployment of a relatively small number of troops over a substantial distance at very high speeds. Such deployment must be carried out under conditions of substantial comfort if the personnel are to arrive at the scene of conflict in a relatively fresh condition. Once at the scene the deploying vehicle must be capable of operating over highly adverse terrain including such obstacles as barricades, rubble from burned or bombed out buildings, bomb craters and the like.

Thus, a need exists for an armored personnel carrier which is adapted to transport troops at relatively high speeds and under conditions of maximum comfort, while at the same time being capable of successfully negotiating various types of extremely adverse terrain. From the standpoint of practicality such an armored personnel carrier should resemble as closely as possible prior armored personnel carrier designs and in fact should incorporate common parts with currently utilized armored personnel carriers insofar as is possible.

The present invention comprises an armored personnel carrier which fulfills the foregoing and other objectives to provide an entirely unique armored personnel carrier design. In accordance with the broader aspects of the invention, an armored personnel carrier includes an armored hull and a prime mover mounted therein which may be identical to those of prior armored personnel carriers. The hull is supported on and transported over the underlying surface by a pair of undercarriages each incorporating the present invention. Each of the undercarriages comprises an elongate hollow primary load bearing frame. A plurality of primary axles are rotatably supported at longitudinally spaced points along the primary frame. A primary transmission mechanism extends through the primary frame for drivingly interconnecting the primary axles, and a drive mechanism is mounted on the frame for cooperation with the primary transmission mechanism to rotate the primary axles.

A plurality of secondary frames are pivotally supported on the primary frame, and a secondary axle is rotatably supported on each secondary frame. A secondary transmission mechanism extends through each secondary frame to provide a driving connection between one of the primary axles and the secondary axle carried by the secondary frame. Each secondary axle supports and drives a wheel member comprising an elastomeric tire. The secondary frames extend angularly downwardly and rearwardly from the primary frame and substantially parallel to each other. Spring mechanisms urge the secondary frames to pivot away from the primary frame. The pivotal movement of the endmost secondary frames is under the action of one spring mechanism, while the pivotal movement of each center secondary frame is under the action of two spring mechansims. By this means the wheel members of the center secondary frames engage the underlying surface under substantially greater force than the endmost wheel members, thereby facilitating skid steering of the armored personnel carrier.

In accordance with more specific aspects of the invention, each secondary frame is hollow and contains the secondary transmission means individual thereto. Each secondary transmission means comprises a sprocket mounted on the associated primary axle, a sprocket mounted on the secondary axle rotatably supported in the secondary frame and a drive chain drivingly interconnecting the two sprockets. Each secondary frame includes a disc brake for selective acutation to arrest rotation of the secondary axle rotatably supported therein and the wheel member carried by the secondary axle.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
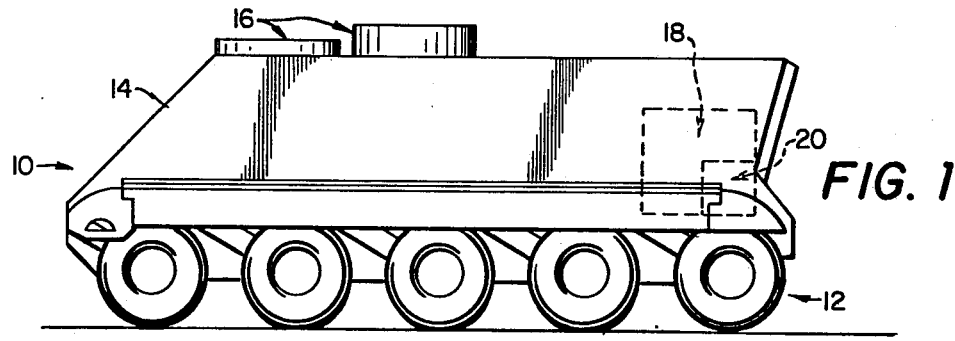
FIG. 1 is a side view of an armored personnel carrier incorporating the undercarriage of the present invention.

Referring now to the Drawings, and particularly to FIG. 1 thereof, there is shown in armored personnel carrier 10 incorporating undercarriages 12 comprising the present invention. The armored personnel carrier 10 includes a hull 14 having one or more hatches 16. The armored personnel carrier 10 may further include various weapons, detection apparatus such as radar, and other accesories and features as required. The hull 14 encloses a prime mover 18 which may comprise an ignition/combustion engine, a diesel engine, a gas turbine, etc. In accordance with the particular application of the invention illustrated in the drawings, the prime mover 18 drives a hydrostatic pump 20 which supplies pressurized hydraulic fluid for operating the undercarriages 12 at the present invention. However, other drive systems may be utilized in the practice of the invention, if desired.

The hull 14 and the primer mover 18 of the armored personnel carrier 10 do not comprise part of the invention. In fact, one of the important features of the invention involves the fact that the undercarriages 12 may be utilized to support and drive an armored personnel carrier comprising a hull 14 and a primer mover 18 of conventional design. That is, the undercarriage is 12 of the present invention may be utilized in conjunction with a conventional armored personnel carrier hull 14 having a conventional prime mover 18 in leiu of the tracks which are conventionally used in conjunction therewith.

Figure 2:
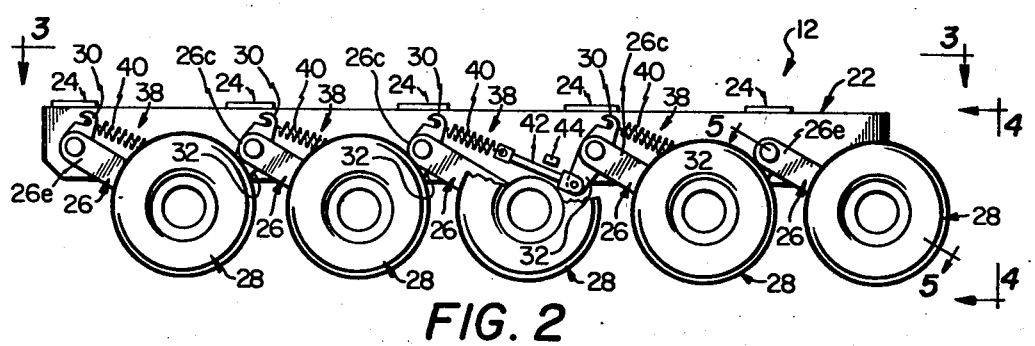
FIG. 2 is a side view of the undercarriage of the armored personnel carrier of FIG. 1 in which certain parts have been broken away more clearly to illustrate certain feature of the invention.

Referring now to FIG. 2, each undercarriage 12 of the armored personnel carrier 10 comprises an elongate hollow load bearing primary a frame 22. The primary frame 22 is of uniform cross sectional configuration throughout its length. This is an important feature of the invention in that it permits the primary frame 22 to be connected to the hull 14 of the armored personnel carrier 10 at any point along its entire length and at any point around its entire periphery without necessitating either redesign of the attachment apparatus of the hull 14 or providing special portions of the primary frame 22 to permit attachment of the hull thereto. A plurality of access ports 24 are provided along the top surface of the primary frame 22 to facilitate assembly of the undercarriage 12 and also to permit periodic maintenance.

A plurality of secondary frames 26 are supported on the primary frame 22 for pivotal movement with respect thereto. Each of the secondary frames 26 in turn supports a wheel member 28 at the distal end thereof. The wheel members 28 preferably comprise elastomeric tires, although other types of wheels may be utilized in the practice of the invention, if desired.

In accordance with the embodiment of the invention illustrated in the drawings, each undercarriage 12 comprises five secondary frames 26 and five wheel members 28 carried thereby. It will be understood that the precise number of secondary frames and wheel members which are utilized in a particular undercarriage is not critical to the practice of the invention. In those instances in which five secondary frames 26 are utilized, there is provided two endmost secondary frames 26e and three center secondary frames 26c.

The forward secondary frames 26e comprises a single lever arm 30 facing rearwardly toward the adjacent center secondary frame 26c. Each of the center secondary frames 26c includes a dual lever arm comprising a lever arm 30 facing the next rearwardly positioned secondary frame and a lever arm 32 facing the next forwardly positioned secondary frame. The rear secondary frame 26e has a single forwardly facing lever arm 32. That is, each of the endmost secondary frames 26e comprises a single lever arm facing the next adjacent center secondary frame 26c, and each of the center secondary frames 26e comprises two lever arms each facing one of the adjacent two secondary frames.

The undercarriage 12 further includes a plurality of spring mechanisms 38 which interconnect the lever arms 30 and 32 of the secondary frames 26. Thus, one of the spring mechanisms 38 interconnects the lever arm 30 of the forward secondary frame 26e and the lever arm 32 of the next adjacent center secondary frame 26c. In turn, a spring mechanism 38 interconnects the lever arm 30 of the forward secondary frame 26c and the lever arm 32 of the middle secondary frame 26c. Likewise, a mechanism 38 interconnects the lever arm 30 of the middle secondary frame 26c and the lever arm 32 of the rearward secondary frame 26c. Finally, a spring mechanism 38 interconnects the lever arm 30 of the rearward secondary frame 26c and the lever arm 32 of the secondary frame 26e situated at the rear of the undercarriage 12.

Each of the spring mechanisms 38 comprises a tension spring 40 and an adjusting mechanism 42 for varying the tension of the spring 40. The tension mechanism 42 may comprise any of the various well known types, for example, the adjusting mechanism 42 may comprise a screw which is received in a nut to adjust the distance between the points of attachment of the tension spring 40 and thereby control the tension of the spring. A stop member 44 is provided for limiting pivotal movement of each secondary frame 26.

As is the case in conventional armored personnel carriers incorporating track-type undercarriages, the armored personnel carrier and of FIG. 1 utilizing the undercarriage 12 of the present invention is skid steered. It has been determined that the effort required to effect steering of a skid steered vehicle can be substantially reduced when the wheel base of the vehicle is minimized. Conversely, in many all terrain vehicles it is desirable to increase the wheel base length for such purposes as increasing stability, increasing traction and providing a more comfortable ride.

These seemingly divergent requirements are accomplished in the undercarriage of the present invention by means of the pivotally supported secondary frames 26 which are interconnected by the spring mechanisms 38. Having reference particularly to FIGS. 2 and 3, it will be understood that the spring mechanisms 38 urge all of the seconday frames 26 and the wheel members 28 carried thereby to pivot away from the primary frame 22. However, whereas each of the endmost secondary frames 26e is urged to pivot away from the primary frame 22 by a single spring mechanism 38, each of the center secondary frames 26c is urged to pivot away from the primary frame 22 by two spring mechanisms 38. Thus, the pivoting spring force which is applied to the center of secondary frames 26c is substantially double that which is supplied to the endmost secondary frames 26e.

The foregoing arrangement allows the use of five wheel members 28 on each of the undercarriages 12 of the armored personnel carrier 10. This is highly desirable in that it increases stability, particularly in those cases in which the loading of the armored personnel carrier may be uneven, in that it substantially increases traction by increasing the number of wheels which are engaged with the underlying surface, and in that it increases comfort for persons riding in the armored personnel carrier by smoothing the movement thereof over obstacles, trenches and the like. However, because of the arrangement of the spring mechanisms 38, the wheel mechanisms carried by the three center secondary frames 26c support approximately 80% of the load which is carried by the undercarriage 12, while the wheel members 28 carried by the two endmost secondary frames 26e carry approximately 20% of the load. Because of the substantially increased loading of the three center wheel members 28, the effective wheel base of the armored personnel carrier is substantially reduced insofar as skid steering is concerned. Thus, the particular arrangement of secondary frames and spring mechanisms which is utilized in the embodiment of the invention illustrated in the drawings provides the dual advantages of a long wheel base vehicle insofar as stability, traction and passenger comfort are concerned while providing the advantages of a short wheel base vehicle with respect to the effort required to effect skid steering.

Figure 3:
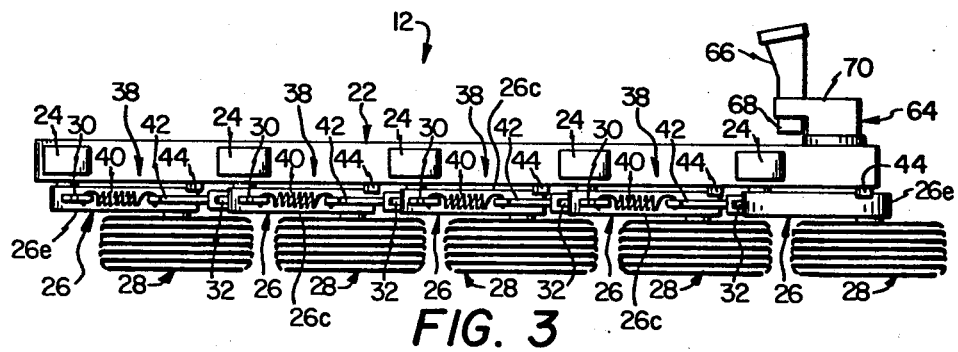
FIG. 3 is a top view of the undercarriage of FIG. 2 taken along the line 3—3 in FIG. 2 in the direction of the arrows.
Figure 4:
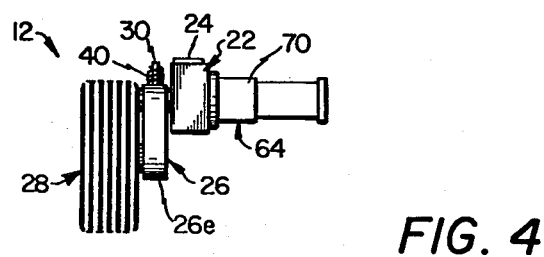
FIG. 4 is an end view of the undercarriage of FIG. 2 taken along the line 4—4 in FIG. 2 in the direction of the arrow.
Figure 5:
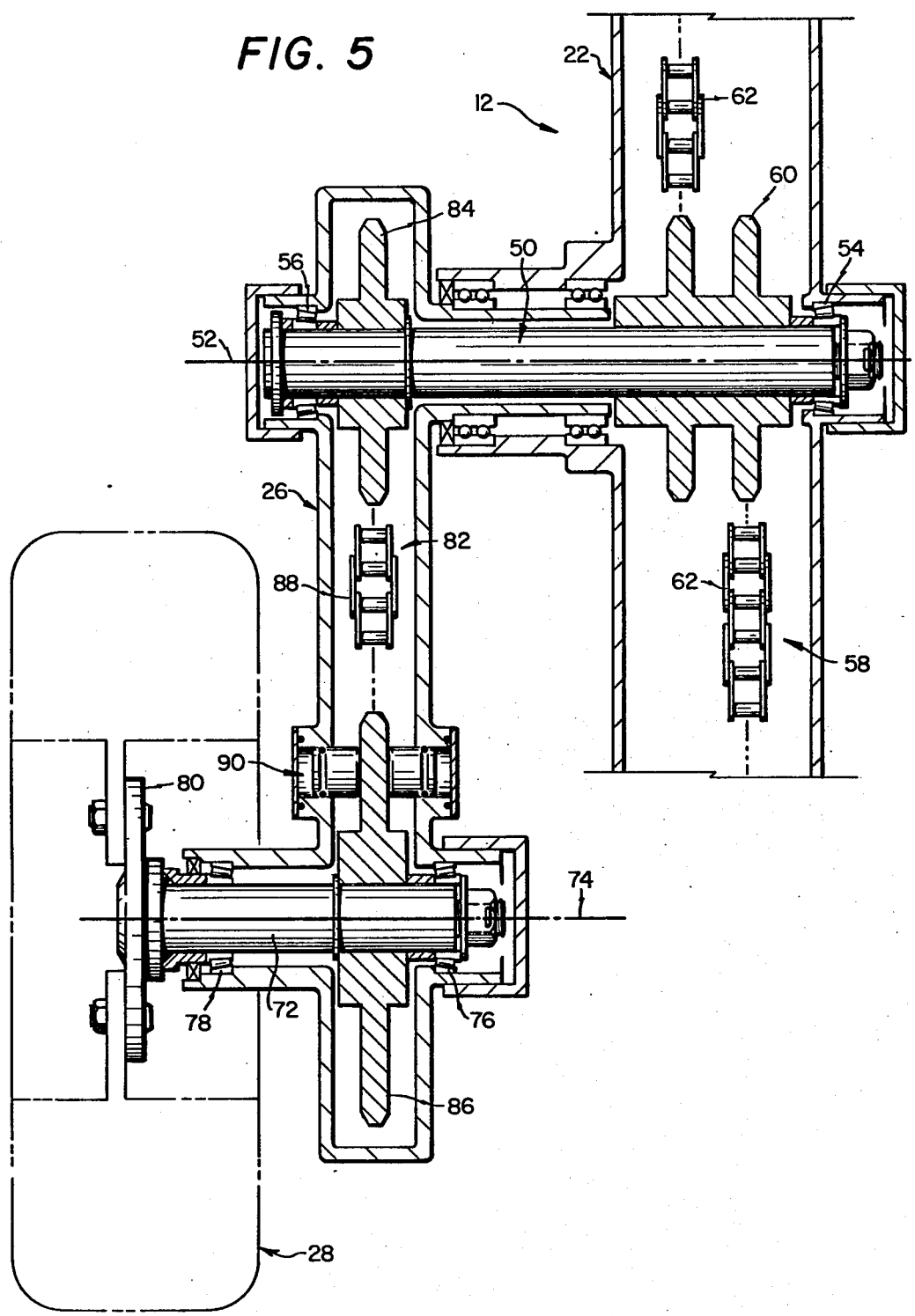
FIG. 5 is a sectional view taken along the line 5—5 in FIG. 2 in the direction of the arrows.

Referring now to FIGS. 3, 4 and 5, the undercarriage 12 of the present invention is shown in greater detail. A plurality of primary axles 50 are positioned at longitudinally spaced points along the primary frame 22. Each primary axle 50 is supported for rotation about an axis 52 by a tapered roller bearing 54 mounted in the primary frame 22 and a tapered roller bearing 56 mounted in the secondary frame 26 individual to the particular axle 50. A primary transmission 58 extends through the primary frame 22 and drivingly interconnects the primary axles 50. The primary transmission 58 comprises a plurality of drive sprockets 60 each mounted on one of the primary axles 50. The drive sprockets 60 are drivingly interconnected by a plurality of drive chains 62.

As is best shown in FIGS. 3 and 4, the undercarriage 12 further comprises a drive mechanism 64. The drive mechanism 64 is mounted on the primary frame 22 and is operatively connected to the primary transmission 58 for cooperation therewith to effect rotation of all of the primary axles 50. The drive mechanism 64 includes a hydrostatic motor 66 which is driven by pressurized hydraulic fluid received from the hydrostatic pump 20 which is driven by the prime mover 18 of the armored personnel carrier 10. The drive mechanism 64 further includes a fail safe brake 68 which comprises the primary braking mechanism for the armored personnel carrier 10 in that upon actuation thereof, operation of the entire undercarriage 12 is arrested. Finally, the drive mechanism 64 includes a planetary speed reducer 70.

The driving connection between the drive mechanisms 64 and the primary transmission 58 of the undercarriage 12 comprises a shaft extending from the planetary speed reducer 70 and having a drive sprocket mounted thereon. The drive sprocket of the output shaft of the planetary speed reducer 70 is in turn drivingly connected to one of the sprockets 60 of the primary transmission 58 by drive chain.

Referring again to FIG. 5, a secondary axle 72 is supported by each of the secondary frames 26. Each secondary axle 72 is supported for rotation about an axis 74 by a pair of tapered roller bearings 76 and 78. The axis 74 extends parallel to the axis 52 of the primary axle 50. The secondary axle 72 extends to a wheel engaging member 80 having the wheel member 28 mounted thereon.

Each secondary frame 26 encloses a secondary transmission 82 which comprises a driving connection between one of the primary axles 50 and the secondary axle 72 individual thereto. Each secondary transmission comprises a sprocket 84 mounted on the primary axle 50, a sprocket 86 mounted on the secondary axle 72 and a drive chain 88 drivingly interconnecting the sprockets 84 and 86. It will thus be understood that upon rotation of the primary axles 50 under the action of the drive mechanism 64 and the primary transmission 58, the secondary transmissions 82 effect rotation of all of the secondary axles 72 and the wheel members 28 carried thereby.

Each secondary frame 26 further includes a disk brake mechanism 90. Upon actuation, the disk brake mechanism arrests rotation of the sprocket 86 of the secondary transmission 82 contained within the particular secondary frame 26 and therefore arrests rotation of the wheel member 28 driven thereby. The disk brake mechanisms 90 of the secondary frames 26 comprise the secondary braking system for the undercarriage 12 in that actuation of all of the disk brakes 90 is necessary in order to fully arrest operation of the driving componets of the undercarriage.

It will thus be understood that the undercarriage of the present invention provides numerous improvements over the prior art, particularly when utilized in conjunction with an armored personnel carrier. Thus, by means of the invention the advantages normally associated with a relatively long wheel base vehicle are fully provided. These include increased stability, increased traction and increased occupant comfort. At the same time, the advantages with respect to reduced skid steering effort that are normally associated with a short wheel base vehicle are fully realized.

Armored personnel carriers incorporating undercarriages of the present invention are adapted for deployment over long distances at high speeds. Upon arrival at the point of conflict the armored personnel carrier is adapted for operation over various types of adverse terrain, including barricades, rubble resulting from burned or bombed out buildings, bomb craters and the like without undue discomfort to occupants of the armored personnel carrier. One particular advantage derived from the use of the invention relates to the pivotally supported secondary frames and spring mechanisms thereof, whereby the wheels of the armored personnel carrier are adpated to "step" over small obstacles and trenches with virtually no discomfort to the occupants of the armored personnel carrier.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. An undercarriage comprising:
   an elongate hollow load bearing primary frame;
   at least three secondary frames;
   means supporting the secondary frames at longitudinally spaced points on the primary frame for pivotal movement with respect thereto;
   at least three primary axles each having a first portion positioned within the primary frame and a second portion positioned within one of the secondary frames;
   means supporting each of the primary axles for rotation both with respect to the primary frame and with respect to its associated secondary frame;
   primary transmission means positioned within the primary frame for drivingly interconnecting at least two of the primary axles;
   drive means operably connected to the primary transmission means for actuation thereof whereby the drive means and the primary transmission means effect concurrent rotation of the interconnected primary axles;
   a plurality of secondary axles each individual to one of the secondary frames and each having a wheel receiving member at one end thereof;

at least three wheel members each mounted on and secured to the wheel receiving end of one of the secondary axles;

means rotatably supporting the secondary axles in the secondary frames with each of the secondary axles extending out of its secondary frame and being rotatably supported in at least one side of its secondary frame;

at least two secondary transmission means each mounted in one of the secondary frames and each drivingly interconnecting one of the primary axles and its associated secondary axle;

each of the endmost secondary frames having a lever arm extending therefrom towards the center secondary frame;

the center secondary frame having two lever arms thereon each extending toward one of the endmost secondary frames;

at least two tension springs, one connected between the lever arm of one of the endmost secondary frames and the facing lever arm of the center secondary frame and the other connected between the lever arm of the opposite endmost secondary frame and the facing lever arm of the center secondary frame;

the tension springs and the lever arms cooperating to urge the secondary frames and the wheel members carried thereby to pivot away from the primary frame and toward the underlying surface; and the endmost secondary frames and the wheel members carried thereby each being pivoted under the force of one tension spring and the center secondary frame and the wheel member carried thereby being pivoted under the action of two tension springs, whereby the center secondary frame and the wheel member carried thereby receive an increased pivoting force to facilitate skid steering of a vehicle incorporating the undercarriage.

2. The undercarriage according to claim 1 wherein the primary transmission means comprises sprockets mounted on at least two of the primary axles and a drive chain drivingly interconnecting the sprockets.

3. The undercarriage according to claim 1 wherein the drive means comprises a hydrostatic drive motor and speed reducing means.

4. The undercarriage according to claim 1 wherein each of the secondary frames extends angularly downwardly from the primary frame towards the underlying surface.

5. The undercarriage according to claim 1 wherein each of the secondary transmission means comprises a sprocket mounted on one of the primary axles, a sprocket mounted on the associated secondary axle and a drive chain drivingly interconnecting the sprockets on the primary and secondary axles.

6. The undercarriage according to claim 1 further characterized by stop means mounted on the primary frame for limiting pivotal movement of each secondary frame with respect thereto.

7. The undercarriage according to claim 1 wherein each of the tension springs is further characterized by adjustment means for varying the pivotal force which is applied thereby to the associated secondary frames.

8. The undercarriage according to claim 1 wherein each of the secondary frames includes brake means for selective actuation to arrest the movement of the wheel member carried by the secondary axle of the secondary frame.

9. The undercarriage according to claim 1 wherein each of the secondary frames is hollow and entirely closes its associated secondary transmission means, wherein all of the secondary frames are positioned on the same side of the primary frame, wherein each of the secondary frames extends angularly downwardly from the primary frame toward the underlying surface, wherein each of the secondary transmission means comprises a sprocket mounted on one of the primary axles, a sprocket mounted on the associated secondary axle, and a drive chain drivingly interconnecting the two sprockets, and wherein each of the secondary frames encloses brake means for selectively arresting rotation of the associated secondary axle.

10. In an undercarriage of the type including an elongate hollow load bearing primary frame, a plurality of primary axles positioned at axially spaced points along the primary frame, frames mounted on the primary frame for supporting the primary axles for rotation with respect thereto, transmission means mounted within the primary frame for drivingly interconnecting at least two of the primary axles, and drive means mounted on the primary frame and drivingly connected to the transmission means for cooperation therewith to drive the interconnected primary axles, the improvement comprising:

a plurality of secondary frames each individual to one of the primary axles;

means supporting each of the secondary frames for pivotal movement relative to the primary frame about an axis which is coincident with the axis of rotation of its associated primary axle;

a plurality of secondary axles each individual to one of the primary axles;

means mounted on the secondary frames for supporting the secondary axles for rotation about axes extending parallel to the axes of rotation of the primary axles;

secondary transmission means mounted within the secondary axles for drivingly interconnecting each primary axle and the secondary axle individual thereto;

the endmost secondary frames each having a lever arm mounted thereon extending toward the center secondary frame and the center secondary frame having two lever arms mounted thereon each extending towards one of the endmost secondary frames; and spring means interconnecting the lever arms of the secondary frames so that the endmost secondary frames are urged to pivot away from the primary frame under the action of one of the spring means and the center secondary frame is urged to pivot away from the primary frame under the action of two of the spring means.

11. The improvement according to claim 10 wherein each secondary transmission means comprises a sprocket mounted on one of the primary axles, a sprocket mounted on the corresponding secondary axle and a drive chain drivingly interconnecting the two sprockets.

12. The improvement according to claim 11 wherein each of the secondary frames further includes brake means for selective actuation to arrest the rotation of the secondary axle carried by the secondary frame and the wheel member carried thereby.

13. The improvement according to claim 12 further including stop means mounted on the primary frame for limiting pivotal movement of the secondary frame with respect thereto.

14. The improvement according to claim 13 wherein the spring means for urging the secondary frames to pivot away from the primary frame comprises tension springs each connected between the lever arms on adjacent secondary frames.

15. The improvement according to claim 14 further including means for selectively adjusting the spring force urging the secondary frames to pivot away from the primary frame.

16. As an undercarriage comprising:
an elongate hollow load bearing primary frame;
a plurality of elongate hollow secondary frames;
means supporting the secondary frames at longitudinally spaced points along the primary frame pivotal movement with respect thereto with the secondary frames normally extending angularly downwardly from the primary frame and substantially parallel to one another;
a plurality of primary axles each individual to one of the secondary frames;
means supporting the primary axles for rotation about axes coincident with the axes of pivotal movement of the secondary frames;
transmission means mounted in the primary frame for drivingly interconnecting all of the primary axles;
drive means mounted on the primary frame and connected to the transmission means for cooperation therewith to drive all of the primary axles;
a plurality of secondary axles each individual to one of the secondary frames;
means for supporting each of the secondary axles on its secondary frames for rotation about an axis extending parallel to the axis of rotation of the primary axle individual thereto;
a plurality of secondary transmission means each for drivingly interconnecting one of the primary axles and the secondary axle individual thereto and each including a sprocket mounted on the primary axle within the secondary frame, a sprocket mounted on the secondary axle within the secondary frame and a drive chain enclosed within the secondary frame for drivingly interconnecting the two sprockets;
the endmost secondary frames each having a lever arm mounted thereon extending towards the center secondary frame;
the center secondary frame having two lever arms mounted thereon each extending towards one of the endmost secondary frames;
at least two tension spring means each connected between the lever arm of one of the endmost secondary frames and the facing lever arm of the center secondary frame for uring the secondary frames to pivot away from the primary frame;
the pivoting force for the endmost secondary frames comprising one of the tension spring means and the pivoting force for the center secondary frame comprising two of the tension spring means so that the center secondary frame is urged downwardly under greater spring force than the endmost secondary frames.

17. The undercarriage according to claim 16 further including a wheel carried by each of the secondary axles and supported thereby adjacent the secondary frame which rotatably supports the secondary axles.

18. The undercarriage according to claim 17 further characterized by:

primary brake means for arresting operation of the primary transmission means and thereby arresting operation of the entire undercarriage; and
secondary brake means mounted within each of the secondary frames for arresting rotation of the secondary axle thereof.

19. The undercarriage according to claim 18 further characterized by:
a plurality of stop means mounted on the primary frame for pivotal movement of the secondary frames with respect thereto; and
wherein each of the tension spring means for urging the secondary frames to away from the primary frame comprised of adjustment means for varying the force supplied by the tension spring means.

20. An armored personnel carrier comprising:
an armored hull;
a prime mover mounted within the armored hull;
a pair of undercarriages positioned on opposite sides of the hull and each comprising:
an elongate hollow loadbearing primary frame;
at least three secondary frames;
means supporting the secondary frames at axially spaced points on the primary frame for pivotal movement with respect thereto at least three primary axles each having a first portion positioned within the primary frame and a second portion positioned within one of the secondary frames;
means supporting each of the primary axles for rotation both with respect to the primary frame and with respect to its associated secondary frame;
primary transmission means positioned within the primary frame for drivingly interconnecting at least two of the primary axles;
drive means operably connected to the primary transmission means for actuation thereof whereby the drive means and the primary transmission means effect concurrent rotation of the interconnected primary axles;
a plurality of secondary axles each individual to one of the secondary frames and each having a wheel receiving member at one end thereof;
at least three wheel members each mounted on and secured to the wheel receiving end of one of the secondary axles;
means rotatably supporting the secondary axles in the secondary frames with each of the secondary axles extending out of its secondary frame and being rotatably supported in at least one side of its secondary frame;
at least three secondary transmission means each mounted in one of the secondary frames and each drivingly interconnecting one of the primary axles and its associated secondary axle;
each of the endmost secondary frames having a lever arm extending therefrom towards the center secondary frame;
the center secondary frame having two lever arms thereon each extending toward one of the endmost secondary frames;
at least two tension springs, one connected between the lever arm of one of the endmost secondary frames and the facing lever arm of the center secondary frame and the other connected between the lever arm of the opposite endmost secondary frame and the facing lever arm of the center secondary frame;

the tension springs and the lever arms cooperating to urge the secondary frames and the wheel members carried thereby to pivot away from the primary frame and toward the underlying surface; and the endmost secondary frames and the wheel members carried thereby each being pivoted under the force of one tension spring and the center secondary frame and the wheel member carried thereby being pivoted under the action of two tension springs, whereby the center secondary frame and the wheel member carried thereby receive an increased pivoting force to facilitate skid steering of a vehicle incorporating the undercarriage.

21. The armored personnel carrier according to claim 20 wherein the secondary frames of each undercarriage are all positioned on the same side of the primary frame and extend angularly downwardly and rearwardly therefrom and substantially parallel to each other.

22. The armored personnel carrier according to claim 21 wherein each undercarriage comprises five seocndary frames each for supporting and driving a wheel member, including two endmost secondary frames and three center secondary frames.

23. The armored personnel carrier according to claim 22 wherein the armored personnel carrier is skid steered and wherein the wheel members carried by the three center secondary frames engage the underlying surface with substantially greater force than the wheel members carried by the endmost secondary frames to facilitate skid steering of the armored personnel carrier.

24. The armored personnel carrier according to claim 23 wherein each of the wheel members carried and driven by one of the secondary axles comprises an elastomeric tire.

* * * * *